US011436657B2

(12) United States Patent
Manggala

(10) Patent No.: US 11,436,657 B2
(45) Date of Patent: Sep. 6, 2022

(54) SELF-HEALING RECOMMENDATION ENGINE

(71) Applicant: Shopify Inc., Ottawa (CA)

(72) Inventor: Putra Manggala, Montreal (CA)

(73) Assignee: Shopify Inc., Ottawa (CA)

( * ) Notice: Subject to any disclaimer, the term of this patent is extended or adjusted under 35 U.S.C. 154(b) by 151 days.

(21) Appl. No.: 16/290,184

(22) Filed: Mar. 1, 2019

(65) Prior Publication Data

US 2020/0279315 A1 Sep. 3, 2020

(51) Int. Cl.
*G06Q 30/06* (2012.01)
*G06F 16/9535* (2019.01)
*G06F 16/28* (2019.01)
*G06N 20/00* (2019.01)

(52) U.S. Cl.
CPC ....... *G06Q 30/0631* (2013.01); *G06F 16/285* (2019.01); *G06F 16/9535* (2019.01); *G06N 20/00* (2019.01)

(58) Field of Classification Search
CPC .............. G06Q 30/0631; G06F 16/285; G06F 16/9535; G06N 20/00
USPC ....................................................... 705/26.7
See application file for complete search history.

(56) References Cited

U.S. PATENT DOCUMENTS

| 7,966,219 B1* | 6/2011 | Singh ................. G06Q 30/0631 705/26.7 |
| 8,650,081 B2* | 2/2014 | Basel ...................... G06F 13/10 705/14.53 |
| 2004/0034612 A1* | 2/2004 | Mathewson ........... G06Q 10/06 706/46 |
| 2011/0302032 A1* | 12/2011 | Ishii ................... G06Q 30/0255 705/14.53 |

(Continued)

FOREIGN PATENT DOCUMENTS

CA 2634020 A1 * 11/2009 ....... G06F 17/30873
IN 201811045640 * 12/2018

OTHER PUBLICATIONS

Y. Zheng, G. Li, W. Zhang, Y. Li and B. Wei, "Feature Selection With Ensemble Learning Based on Improved Dempster-Shafer Evidence Fusion," Dec. 10, 2018, in IEEE Access, vol. 7, pp. 9032-9045, 2 (Year: 2018).*

*Primary Examiner* — Matthew E Zimmerman
*Assistant Examiner* — Thomas Joseph Sullivan
(74) *Attorney, Agent, or Firm* — GTC Law Group PC & Affiliates

(57) ABSTRACT

A computer-implemented method and system including a recommendation engine receiving a first user behavior data, the first user behavior data associated with a user action taken by a user, wherein the recommendation engine utilizes a recommendation model to generate recommendations to users based on first user behavior data; labeling the first user behavior; classifying the labeled first user behavior; gener- (Continued)

ating, by the recommendation engine, a recommendation to the user based on the classifying of the labeled first user behavior; providing, by the recommendation engine, the recommendation to the user; receiving, by the recommendation engine, a second user behavior data, the second user behavior data associated with a user response by the user to the recommendation; and evaluating, by the recommendation engine, the second user behavior data and performing a corrective action to the recommendation model.

29 Claims, 5 Drawing Sheets

(56) References Cited

U.S. PATENT DOCUMENTS

| | | | | |
|---|---|---|---|---|
| 2012/0093396 | A1* | 4/2012 | Dai | G06K 9/6232 |
| | | | | 382/159 |
| 2014/0032358 | A1* | 1/2014 | Perkowitz | G06N 20/00 |
| | | | | 705/26.7 |
| 2014/0067596 | A1* | 3/2014 | McGovern | G06Q 30/0246 |
| | | | | 705/26.7 |
| 2014/0129371 | A1* | 5/2014 | Wilson | G06Q 30/0631 |
| | | | | 705/26.7 |
| 2015/0134413 | A1* | 5/2015 | Deshpande | G06Q 30/0202 |
| | | | | 705/7.31 |
| 2016/0110772 | A1* | 4/2016 | Herring | G06Q 30/016 |
| | | | | 705/14.66 |
| 2018/0285423 | A1* | 10/2018 | Ciano | G06Q 50/01 |
| 2019/0361918 | A1* | 11/2019 | Rogynskyy | G06F 16/2457 |
| 2020/0175528 | A1* | 6/2020 | Bazari | G06Q 30/0201 |

\* cited by examiner

FIG. 2

SELF-HEALING RECOMMENDATION ENGINE

FIELD

The present disclosure relates generally to user recommendations in an e-commerce environment, and more particularly to a self-healing recommendation engine.

BACKGROUND

Recommendations provided to users of e-commerce are typically based on user characterization, such as on a user's demographic, previous purchases, and the like. However, there is a need in the art for computer-based methods and systems that improve future user recommendations.

SUMMARY

In an aspect, a computer-implemented method may include receiving, by a recommendation engine, a first user behavior data, the first user behavior data associated with a user action taken by a user, wherein the recommendation engine utilizes a recommendation model to generate recommendations to users based on user behavior data; labeling the user behavior; classifying the labeled user behavior; generating, by the recommendation engine, a recommendation to the user based on the classifying of the labeled user behavior; providing, by the recommendation engine, the recommendation to the user; receiving, by the recommendation engine, a second user behavior data, the second user behavior data associated with a user response by the user to the recommendation; and evaluating, by the recommendation engine, the second user behavior data and performing a corrective action to the recommendation model. In embodiments, assigning a confidence score may be in association with labeling the user behavior, wherein the evaluating is based on the received second user behavior and where the corrective action is generating an updated confidence score for the user behavior. The evaluating may be an evaluation of a process step in the labeling of the user behavior. The labeling may be performed by a labeling agent, wherein the corrective action further comprises at least one of adjusting or replacing the labeling agent. The evaluating may be an evaluation of a process step in the classifying of the labeled user behavior. The classifying may be performed by an agent, wherein the corrective action further comprises at least one of adjusting or replacing the agent. The evaluating may be an evaluation of a process step in the generation of the recommendation. The evaluating may be a combined evaluation of at least two of labeling the user behavior, classifying the labeled user behavior, and generating a recommendation. The evaluating may be an evaluation of a process step in at least one of labeling the user behavior, classifying the labeled user behavior, and generating a recommendation based on a data field of the second user behavior data. The corrective action may be a change to a weighting associated with the recommendation model. Weighting may be associated with the labeling of the user behavior, wherein the weighting is associated with a weighting function that represents a confidence level on the goodness of the labeling. Weighting may be associated with the classifying of the labeled user behavior, wherein the weighting is associated with a weighting function that represents a confidence level on the goodness of the classifying. Weighting may be associated with the generating of the recommendation, wherein the weighting is associated with a weighting function that represents a confidence level on the goodness of the recommendation. The user action may be at least one of a browsing action, a communication action, a purchase action, or an installation action. The user action may be an action taken by the user in response to a recommendation.

In an aspect, a system may include a first computing device comprising a recommendation engine, the recommendation engine receiving a first user behavior data from a data facility, the first user behavior data associated with a user action taken by a user, wherein the recommendation engine utilizes a recommendation model to generate recommendations to users based on user behavior data, the first computing device configured to store a set of instructions that, when executed, cause the first computing device to: label the user behavior; classify the labeled user behavior; generate a recommendation directed to the user based on the classifying of the labeled user behavior; provide the recommendation to a second computing device; receive a second user behavior data, the second user behavior data associated with a user response by the user to the recommendation; and evaluate the second user behavior data and performing a corrective action to the recommendation model. In embodiments, assigning a confidence score may be in association with labeling the user behavior, wherein the evaluating is based on the received second user behavior and where the corrective action is generating an updated confidence score for the user behavior. The evaluating may be an evaluation of a process step in the labeling of the user behavior. The labeling may be performed by a labeling agent, wherein the corrective action further comprises at least one of adjusting or replacing the labeling agent. The evaluating may be an evaluation of a process step in the classifying of the labeled user behavior. The classifying may be performed by an agent, wherein the corrective action further comprises at least one of adjusting or replacing the agent. The evaluating may be an evaluation of a process step in the generation of the recommendation. The evaluating may be a combined evaluation of at least two of labeling the user behavior, classifying the labeled user behavior, and generating a recommendation. The evaluating may be an evaluation of a process step in at least one of labeling the user behavior, classifying the labeled user behavior, and generating a recommendation based on a data field of the second user behavior data. The corrective action may be a change to a weighting associated with the recommendation model. Weighting may be associated with the labeling of the user behavior, wherein the weighting is associated with a weighting function that represents a confidence level on the goodness of the labeling. Weighting may be associated with the classifying of the labeled user behavior, wherein the weighting is associated with a weighting function that represents a confidence level on the goodness of the classifying. Weighting may be associated with the generating of the recommendation, wherein the weighting is associated with a weighting function that represents a confidence level on the goodness of the recommendation. The user action may be at least one of a browsing action, a communication action, a purchase action, or an installation action. The user action may be an action taken by the user in response to a recommendation.

In an aspect, a computer-implemented method for a user interface may include receiving, by a recommendation engine, a first user behavior data, the first user behavior data associated with a user action taken by a user, wherein the recommendation engine utilizes a recommendation model to generate recommendations to users based on user behavior data; labeling the user behavior; classifying the labeled user behavior; generating, by the recommendation engine, a recommendation to the user based on the classifying of the labeled user behavior; providing, by the recommendation engine, the recommendation to the user; receiving, by the recommendation engine, a second user behavior data, the second user behavior data associated with a user response by the user to the recommendation; and displaying an evaluation user interface for evaluating, by the recommendation engine, the second user behavior data and performing a corrective action to the recommendation model. In embodiments, the evaluating may be an evaluation of a process step in the labeling of the user behavior. The labeling may be performed by a labeling agent, wherein the corrective action further comprises at least one of adjusting or replacing the labeling agent. The evaluating may be an evaluation of a process step in the classifying of the labeled user behavior. The classifying may be performed by an agent, wherein the corrective action further comprises at least one of adjusting or replacing the agent. The evaluating may be an evaluation of a process step in the generation of the recommendation. The evaluating may be a combined evaluation of at least two of labeling the user behavior, classifying the labeled user behavior, and generating a recommendation. The evaluating may be an evaluation of a process step in at least one of labeling the user behavior, classifying the labeled user behavior, and generating a recommendation based on a data field of the second user behavior data. The corrective action may be a change to a weighting associated with the recommendation model. Weighting may be associated with the labeling of the user behavior, wherein the weighting is associated with a weighting function that represents a confidence level on the goodness of the labeling. Weighting may be associated with the classifying of the labeled user behavior, wherein the weighting is associated with a weighting function that represents a confidence level on the goodness of the classifying. Weighting may be associated with the generating of the recommendation, wherein the weighting is associated with a weighting function that represents a confidence level on the goodness of the recommendation. The user action may be at least one of a browsing action, a communication action, a purchase action, or an installation action. The user action may be an action taken by the user in response to a recommendation.

In an aspect, a system may include a first computing device comprising a recommendation engine, the recommendation engine receiving a first user behavior data from a data facility, the first user behavior data associated with a user action taken by a user, wherein the recommendation engine utilizes a recommendation model to generate recommendations to users based on user behavior data, the first computing device configured to store a set of instructions that, when executed, cause the first computing device to: label the user behavior; classify the labeled user behavior; generate, by the recommendation engine, a recommendation to the user based on the classifying of the labeled user behavior; provide, by the recommendation engine, the recommendation to the user; receive, by the recommendation engine, a second user behavior data, the second user behavior data associated with a user response by the user to the recommendation; and display, on a second computing device, an evaluation user interface for evaluating, by the recommendation engine, the second user behavior data and performing a corrective action to the recommendation model. In embodiments, the evaluating may be an evaluation of a process step in the labeling of the user behavior. The labeling may be performed by a labeling agent, wherein the corrective action further comprises at least one of adjusting or replacing the labeling agent. The evaluating may be an evaluation of a process step in the classifying of the labeled user behavior. The classifying may be performed by an agent, wherein the corrective action further comprises at least one of adjusting or replacing the agent. The evaluating may be an evaluation of a process step in the generation of the recommendation. The evaluating may be a combined evaluation of at least two of labeling the user behavior, classifying the labeled user behavior, and generating a recommendation. The evaluating may be an evaluation of a process step in at least one of labeling the user behavior, classifying the labeled user behavior, and generating a recommendation based on a data field of the second user behavior data. The corrective action may be a change to a weighting associated with the recommendation model. Weighting may be associated with the labeling of the user behavior, wherein the weighting is associated with a weighting function that represents a confidence level on the goodness of the labeling. Weighting may be associated with the classifying of the labeled user behavior, wherein the weighting is associated with a weighting function that represents a confidence level on the goodness of the classifying. Weighting may be associated with the generating of the recommendation, wherein the weighting is associated with a weighting function that represents a confidence level on the goodness of the recommendation. The user action may be at least one of a browsing action, a communication action, a purchase action, or an installation action. The user action may be an action taken by the user in response to a recommendation.

In an aspect, a computer-implemented method for a user interface may include receiving, by a recommendation engine, a first user behavior data, the first user behavior data associated with a user action taken by a user, wherein the recommendation engine utilizes a recommendation model to generate recommendations to users based on user behavior data; labeling the user behavior; classifying the labeled user behavior; generating, by the recommendation engine, a recommendation to the user based on the classifying of the labeled user behavior; providing, by the recommendation engine, the recommendation to the user; receiving, by the recommendation engine, a second user behavior data, the second user behavior data associated with a negative user response by the user to the recommendation; displaying on a computer device the labeled user behavior and the negative user response; and displaying a root cause analysis, wherein the root cause analysis initiates a root cause processing function to evaluate the labeled user behavior based on the negative user response. In embodiments, the labeled user behavior may be further evaluated based on the labeling of the user behavior. The labeling may be performed by a labeling agent, wherein the root cause analysis recommends a corrective action further comprising at least one of adjusting or replacing the labeling agent. The labeled user behavior may be further evaluated based on the classifying of the labeled user behavior. The classifying may be performed by an agent, wherein the root cause analysis recommends a corrective action further comprising at least one of adjusting or replacing the agent. The labeled user behavior may be evaluated based on the generating of the recommendation. The evaluating may be a combined evaluation of at least two of labeling the user behavior, classifying the labeled user behavior, and generating a recommendation. The evaluating may be an evaluation of a process step in at least one of labeling the user behavior, classifying the labeled user behavior, and generating a recommendation based on a data field of the second user behavior data. The labeled user behavior may be evaluated based on a confidence score assigned to the labeled user behavior. The confidence score may be generated by a software-based agent. The confidence score may be generated by a human agent.

In an aspect, a system may include a first computing device comprising a recommendation engine, the recommendation engine receiving a first user behavior data from a data facility, the first user behavior data associated with a user action taken by a user, wherein the recommendation engine utilizes a recommendation model to generate recommendations to users based on user behavior data, the first computing device configured to store a set of instructions that, when executed, cause the first computing device to: label the user behavior; classify the labeled user behavior; generate, by the recommendation engine, a recommendation to the user based on the classifying of the labeled user behavior; provide, by the recommendation engine, the recommendation to the user; receive, by the recommendation engine, a second user behavior data, the second user behavior data associated with a negative user response by the user to the recommendation; display, on a second computer device, the labeled user behavior and the negative user response; and display, on the second computer device, a root cause analysis, wherein the root cause analysis initiates a root cause processing function to evaluate the labeled user behavior based on the negative user response. In embodiments, the labeled user behavior may be further evaluated based on the labeling of the user behavior. The labeling may be performed by a labeling agent, wherein the root cause analysis recommends a corrective action further comprising at least one of adjusting or replacing the labeling agent. The labeled user behavior may be further evaluated based on the classifying of the labeled user behavior. The classifying may be performed by an agent, wherein the root cause analysis recommends a corrective action further comprising at least one of adjusting or replacing the agent. The labeled user behavior may be evaluated based on the generating of the recommendation. The evaluating may be a combined evaluation of at least two of labeling the user behavior, classifying the labeled user behavior, and generating a recommendation. The evaluating may be an evaluation of a process step in at least one of labeling the user behavior, classifying the labeled user behavior, and generating a recommendation based on a data field of the second user behavior data. The labeled user behavior may be evaluated based on a confidence score assigned to the labeled user behavior. The confidence score may be generated by a software-based agent. The confidence score may be generated by a human agent.

BRIEF DESCRIPTION OF THE FIGURES

FIG. 2 depicts an embodiment of a home page of an administrator.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
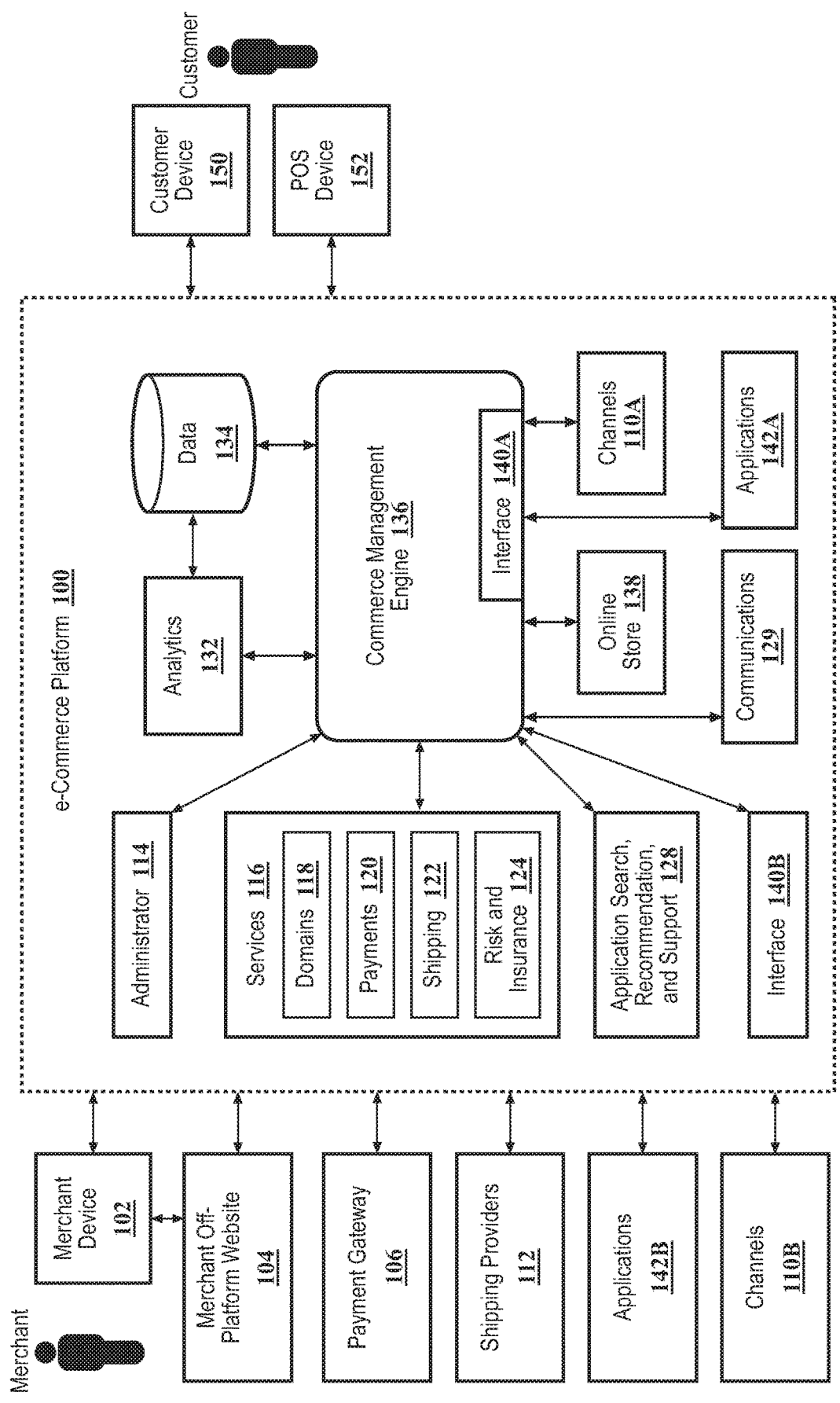
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
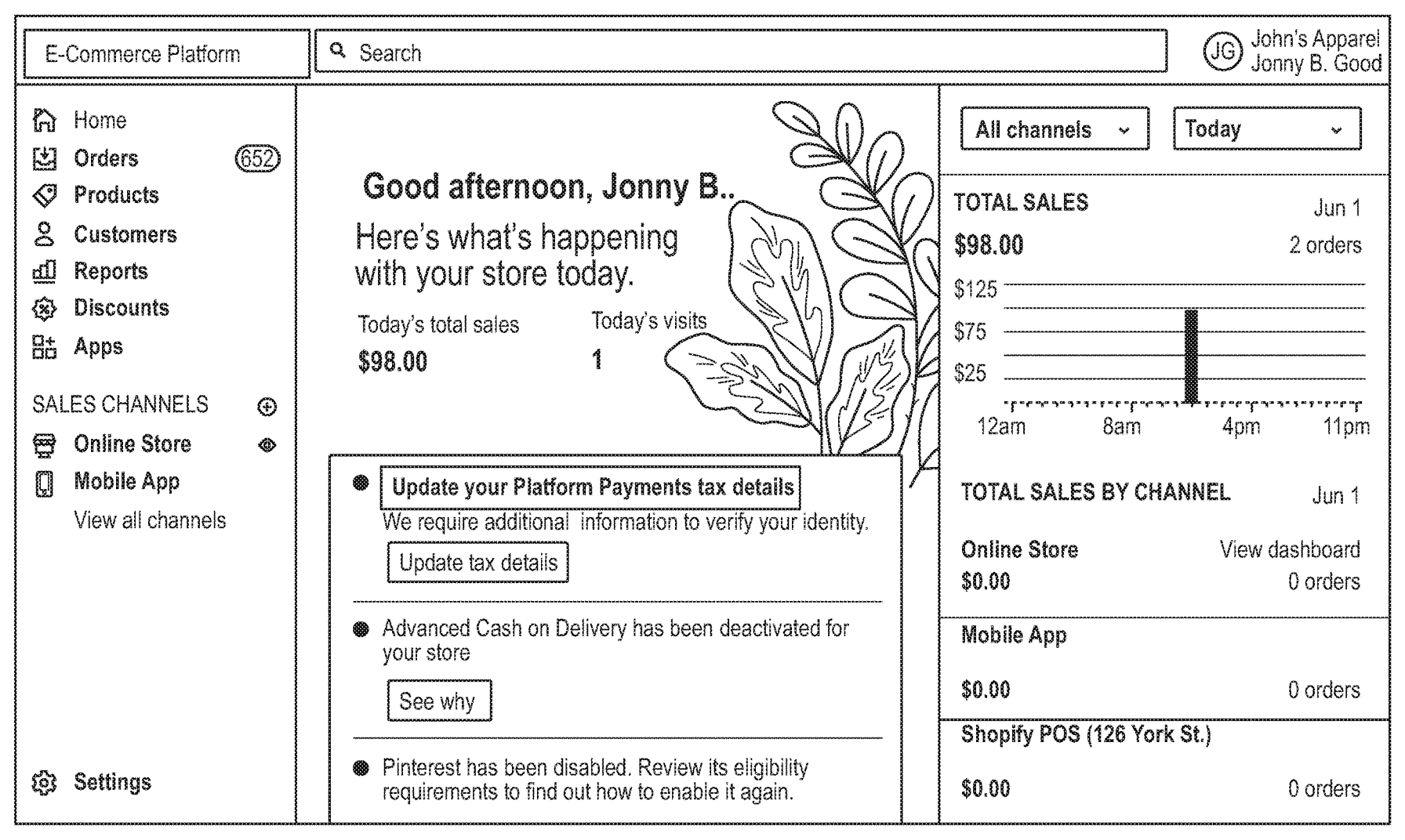

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancellation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide recommendations to users, such as to customers, merchants, application developers, and the like, in response to user purchases, sales, communications, channel interactions, application interactions, services, payments, shipping, administration, or any other commerce-related action or omission taken through the e-commerce platform 100. Recommendations provided to users may enable merchants to improve sales, customers to improve their e-commerce experience, application developers to improve the development of applications that are more responsive to users, and the like. Further, the e-commerce platform 100 may utilize a user's response (or non-response), actions (or non-action), and the like, to recommendations to improve recommendation models in order to improve the quality or goodness of the recommendations being provided to the user. It should be understood that references to a user's response or action throughout the disclosure may be a response that is a non-response or an action to be a non-action or omission. For instance, a user may 'respond' to a recommendation by downloading a new application, by not downloading the new application, and the like. A user may take the 'action' to like a recommendation or to not like a recommendation. As such, it may be important to consider the responses and actions taken by a user, as well as the responses and actions not taken by the user, in the process of improving the effectiveness of recommendation models. In embodiments, non-ideal recommendation model outputs (e.g., recommendations) may be healed through a feedback-based evaluation of model process layers (e.g., labeling of user behavior, categorization of labeled behavior, generation of recommendations, and the like), and input assumptions (e.g., assumptions associated with raw behaviors).

Figure 3:
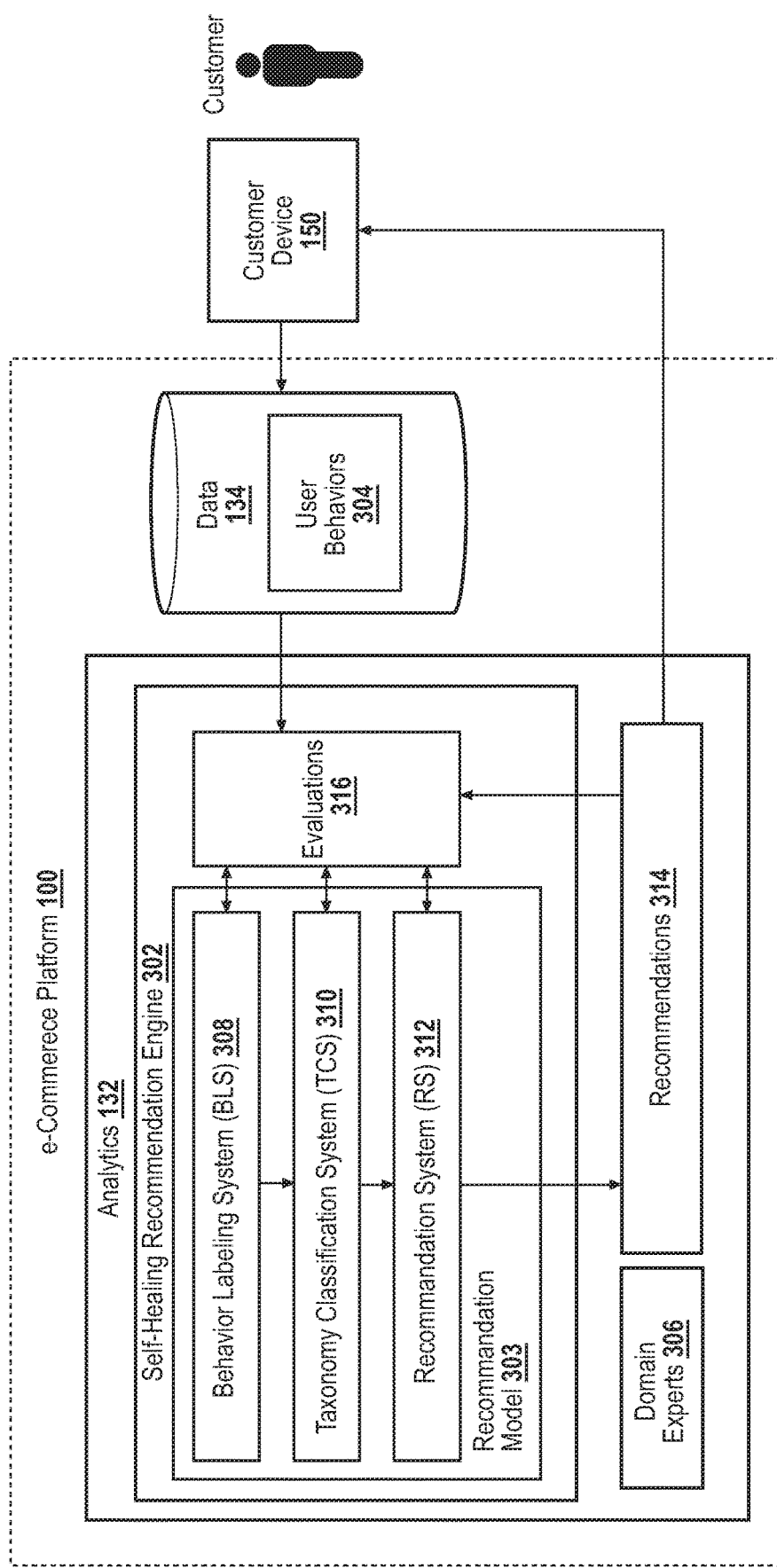
FIG. 3 depicts an embodiment functional block diagram for an e-commerce platform self-healing engine.

Referring to FIG. 3, the e-commerce platform 100 may utilize a self-healing recommendation engine 302 for making recommendations 314 to users, such as based on user behavior data 304. User behavior data 304 may provide a global view of how users behave on the e-commerce platform 100, and as such may provide the raw data to generate recommendations that are useful and effective. Further, user behavior data 304 may provide insight into the intentions that user behaviors represent, which may then be used to improve the underlying recommendation models and algorithms (e.g., by changing the weights related to certain data, process layers, and variables of the recommendation model).

User behavior data 304 may result from federated tracking of user behavior across the e-commerce platform 100, where users may be any person or entity that a recommendation is provided to, such as a merchant, customer, third-party entity (e.g., service provider), software agent (e.g., an automated agent, such as acting on the behalf of a merchant, customer, or third-party), and the like, such as described throughout this disclosure. User actions associated with e-commerce platform domains or properties may be tracked longitudinally over time, such as from activity across online stores, themes adopted in online stores, merchant and/or customer blogs, e-commerce platform landing pages for new users, administrators for managing e-commerce activity such as associated with an online store, documents exchanged across the e-commerce platform, domain experts, applications and application developers, and the like. Collecting user behavior data may be from across the e-commerce platform 100, such as where user behavior may be any act or omission (e.g., not acting on a recommendation) taken on the e-commerce platform 100 (e.g., as associated with browsing, selecting, communicating, buying, clicking, installing, reading, adopting a recommendation, and the like). Behavior harvesting locations on the e-commerce platform 100 may include a home page (e.g., acting on a recommendation presented on the home page), application store (e.g., installing or uninstalling an application), administrator 114 (e.g., managing recommendations), theme store (e.g., adopting a theme), interactions with service providers or partners (e.g., adopting a drop-shipping provider), and the like. Behaviors may also be harvested from physical storefronts, such as through cameras or other sensors in the physical store (e.g., actions with products, at a POS device, and the like).

In embodiments, the self-healing recommendation engine 302 may comprise a machine learning recommendation model 303, such as including process layers represented in a behavior labeling system (BLS) 308, a taxonomy classification system (TCS) 310, recommender system (RS) 312, and the like. In embodiments, the recommendation model 303 may have a plurality of inputs (e.g., labels associated with behaviors, taxonomy of labels and taxonomy of behaviors), process layers (e.g., BLS, TCS, RS), weights (e.g., determined through initial training and adjusted through time based on feedback to the machine learning model), outputs (e.g., recommendations), limits (e.g., limits on frequency of recommendations, such as due to user saturation on a recommendation topic), and the like.

Figure 4:
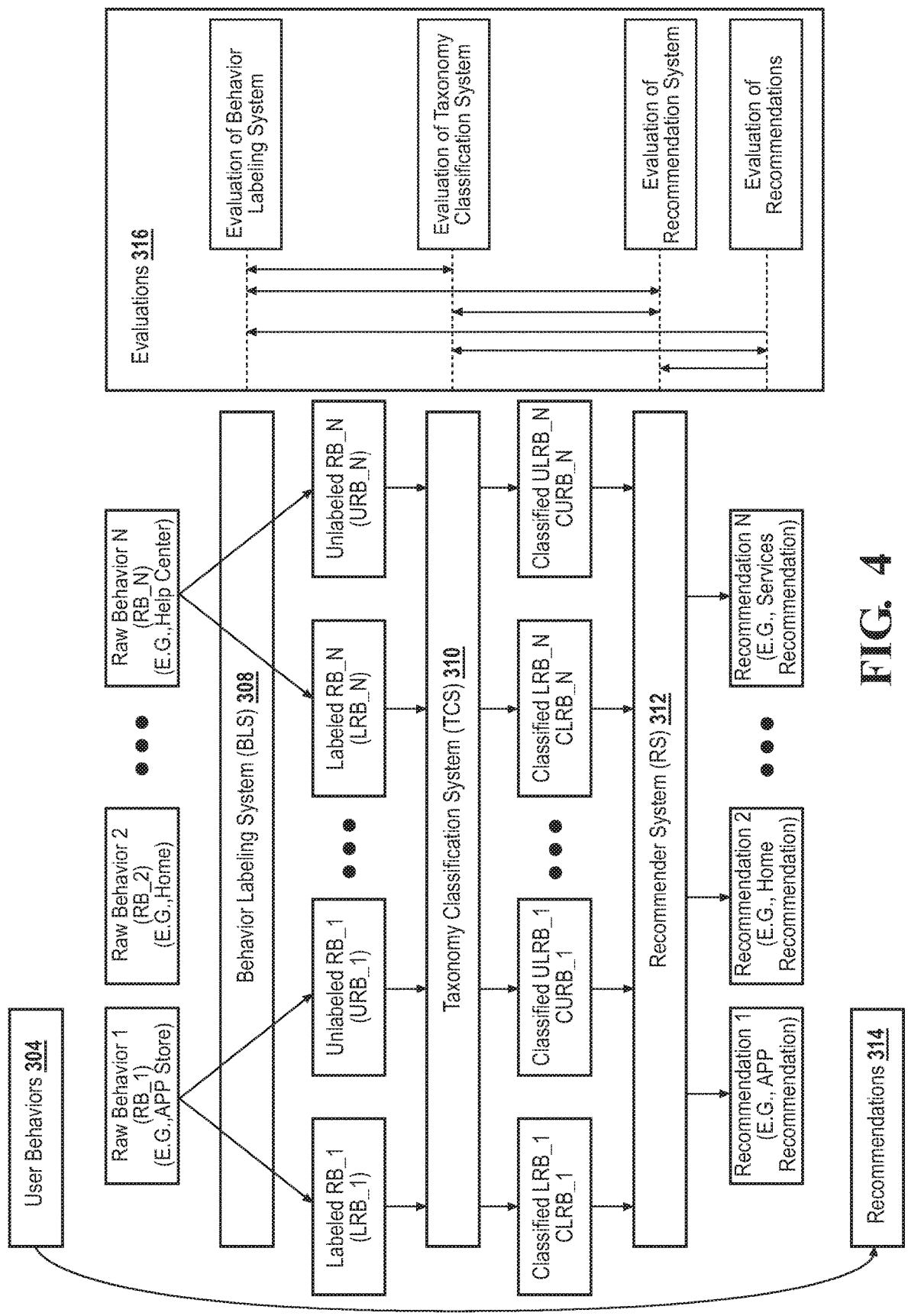
FIG. 4 depicts an embodiment process flow for feedback in generating recommendations from user behaviors.

In a first processing layer of the recommendation model 303 the BLS 308 may execute the function of labeling raw user behaviors (e.g., user behaviors directly from the data facility 134), such as with descriptors, to create labeled raw behaviors (LRB). Alternately, the BLS 308 may not have sufficient information to make a labeling assignment, and so create unlabeled raw behaviors (URB). In embodiments, labeling may be based on an existing label type (e.g., a label that was previously created, such as from a previous behavior processing or as a general training type label) or created as a new label (e.g., at the time of the labeling). In embodiments, the label may be created and/or assigned by an automated software agent, a human agent, or a hybrid of a human agent working with a software agent (e.g., where the automated agent makes a proposed label assignment, plurality of proposed label assignments, a ranked listing of proposed label assignments, and the like, and the human agent selects the label, category, or provides other input). In embodiments, a software agent may be trained on a data set where it is able to label a behavior that was previously determined to be an URB. For example, the software agent may be able to assign the label 'checkout' to a previously unlabeled user behavior through associated semantics and context around the subject of a product checkout. Referring to the FIG. 4 process flow diagram, the BLS 308 may label a plurality of raw behaviors (RB_N), such as from a plurality of sources (e.g., application store, home page, help center, and the like) as a plurality of LRBs (LRB_N) and plurality of URBs (URB_N). In embodiments, a raw behavior may be assigned one or more labels, such as RB_1 being assigned multiple labels to become LRB_1. Behavior labels may correspond to a specific action (e.g., user selecting a new theme based on a recommendation), a content area (e.g., marketing), a commerce process topic (e.g., drop shipping), and the like, such as labels for applications, themes, customer contact, marketing, drop shipping, payments, retail, deliveries and pickups, accounting and taxes, and the like.

In a non-limiting example of notations used with the BLS 308, let e-commerce domain experts (automated or human agents) be $T_i$ where $I \in N$ (N e-commerce domain experts). Denote raw behavior as $RB_{vj}$ where v corresponds to an app store, a home page, and the like, and j corresponds to a particular instance of behavior content (e.g., if a raw behavior occurs multiple times across different shops/users and across time for a given shop/user, they will have the same index j if their content remains the same). Each raw behavior $RB_{vj}$ then undergo labeling performed by domain experts (such as in the BLS) and is transformed to either $LRB_{vj}$ (labeled raw behavior) or $URB_{vj}$ (unlabeled raw behavior), where $LRB_{ivj} = (RB_{vj}, label_{vj}, T_i)$ for some e-commerce related label $label_{vj}$ and domain expert $T_i$, and $URB_{vj} = RB_{vj}$.

In a second processing layer of the recommendation model 303 the TCS 310 may execute the function of classifying the plurality of LRB_N and URB_N into a taxonomy or taxonomies. The TCS 310 may be trained on labeled raw behaviors, prior classified behaviors (e.g., labeled or not), and the like. In embodiments, the recommendation model 303 may be constantly adjusted based on top-down label changes from the BLS 308 or from bottom-up changes from the RS 312. In embodiments, rules for classifying may be based on label descriptors, such as assigned at the TCS 310 level, as previously assigned to a classification, and the like. Receiving LRB_N and URB_N as inputs to the TCS 310, the TCS 310 outputs classified LRB_N (CLRB_N) and classified URB_N (CURB_N). Alternately, the TCS 310 may not be able to determine a classification, which would then result in outputs as unclassified LRB_N and unclassified URB_N (not shown on FIG. 4). The taxonomy generation process may generate multiple levels of taxonomy, such as including a top or first level (e.g., shipping; marketing), a second level (e.g., drop shipping; email marketing and social media marketing), a third level (e.g., third party shippers; email providers), and the like. In embodiments, the TCS 310 may be curated, such as through an automated software agent, human agent, or a hybrid of a human agent working with an automated software agent). For instance, the taxonomy may be changed by removing an item (e.g., a label or behavior) from the taxonomy, adding an item to the taxonomy, modifying an item in the taxonomy, and the like.

In a non-limiting example of notations used with the TCS 310, each $LRB_{ivj}$ and $URB_{vj}$ is classified by the TCS 310 to produce $CLRB_{ivj}$ and $CURB_{vj}$, respectively where $CLRB_{ivj}=$ ($LRB_{ivj}$, $class_{vj}$) and $CURB_{vj}=(URB_{vj}$, $class_{vj}$) for some e-commerce related label $class_{vj}$ (note that this is might be a different label space from $label_{vj}$). $CLRB_{ivj}$ and $CURB_{vj}$ are then used in an aggregate way in the recommender system (RS) 312 to produce various kinds of recommendations.

In embodiments, the overall system may determine that the labels applied by a particular domain expert should be weighted to determine if the action should occur. With reference to the case where the label space $label_{vj}$ $class_{vj}$, i.e., the label space in BLS is the same as TCS, the system may seed and update a weight function (e.g., based on downstream performance) $W_{BLS}(T_i, RB_{vj})$ which represents a confidence level on the goodness of domain expert $T_i$'s labeling on raw behavior $RB_{vj}$. Let the threshold $\gamma$ be such that if $W_{BLS}(T_i, RB_{vj}) > \gamma$, then the system performs the labeling to output $LRB_{ivj}$, otherwise the system does not label, producing $URB_{vj}$. Further, the system may seed and update a weight function (based on downstream performance) $W_{TCS}$ which is able to output a confidence score on the goodness of TCS on classifying a particular $LRB_{ivj}$ and $URB_{vj}$.

In a third processing layer of the recommendation model 303 the RS 312 may execute the function of generating recommendations 314, taking the taxonomy classifications to determine a user's intent and making recommendations based on determined intent (e.g., recommend a best application for a user that is a new merchant). In addition to utilizing a determined user intent, the RS 312 may utilize user profiles to generate recommendations (e.g., a user profile indicates a particular user does not typically use applications, so the RS 312 does not provide many recommendations related to applications). In embodiments, the RS 312 may determine a recommendation based on what is best for the user and consider how they are likely to react. Recommendations types may include application recommendations, home page recommendations, services recommendations, themes recommendations, blog recommendations, help document recommendations, and the like.

In embodiments, the RS 312, for a given $RB_{vj}$, may use $CLRB_{ivj}$ weighted by $W_{BLS}$ and $W_{TCS}$ values related to it, or $CURB_{vj}$ weighted by $W_{TCS}$ related to it, to power a recommendation for the end user. The system may then apply an update on the weight function(s) based on the user's feedback. For example, if a recommendation influenced by $CLRB_{ivj}$ is not accepted, the system may update the function such that in the future, $W_{BLS}$ for $T_i$ and $RB_{vj}$ and $W_{TCS}$ ($LRB_{ivj}$) will be lower than before (e.g., signifying the fact that the system has lost a degree of confidence on these datasets).

In embodiments, evaluations 316 by the self-healing recommendation engine 302 may provide for evaluation of the behavior labeling system 308, evaluation of the taxonomy classification system 310, evaluation of the recommendation system 312, evaluation of the recommendations 314, and the like.

Evaluation of recommendations 314 may be processed by evaluating behavior related actions taken by a user, such as evaluating the 'goodness' of a recommendation and tagging in relation to the upstream behavior. For instance, an outcome may be determined to be good if a merchant follows a recommendation (e.g., 'likes' the recommendation or downloads an app recommended), and some degree of less good when they don't (e.g., the merchant does nothing after the recommendation is sent to them, or rejects, unlikes, or uninstalls an application that was recommended). In embodiments, there may be a high correlation between the feedback from downstream recommendations and inferences and related upstream inputs such as labeled behaviors. In embodiments, outcomes may be analyzed across a spectrum of possible outcomes as a measure of goodness, such as following a recommendation, performing an action or adjacent action associated with the recommendation, ignoring the recommendation, omitting an action that is part of a recommendation, act or omission contrary to the recommendation, and the like.

Evaluation of the recommendation system 312, the taxonomy classification system 314, and/or the behavior labeling system 316 may be based on the goodness of recommendations 314 but may also be based on the performance of the downstream and upstream processing layers (e.g., how well a system fairs in its evaluation relative to the evaluation of the other processing layers in the recommendation model). Processing layers may be evaluated on how well they contributed to the making of recommendations, or how well they determined a behavior, labeled a behavior, classified a labeled behavior (or could not label a behavior or classify a labeled behavior), and the like. The recommendation system 312 may be evaluated on how well it made recommendations. The taxonomy classification system 310 may be evaluated based on how well it classified labeled behaviors, unlabeled behaviors, and labels themselves, and/or on how well the system determined that a behavior or label could or could not be classified. Evaluating the behavior labeling system 308 may be based on taxonomy classification anomalies, how well the system labeled behaviors (e.g., both with existing labels and labels it created), how well the system determined that a behavior could or could not be labeled, and the like.

Possible outcomes based on evaluations 316 may include evaluating an originating labeling agent (e.g., tracking and/or rating a human agent and/or software agent based on recommendation(s) resulting from the labeling or adjusting weights associated with data from the agent based on a user's reaction to the associated recommendation(s)), evaluating a label identification description (e.g., changing a label, adding a new label, or ceasing use of a label), adjusting or 'nudging' model weights such as associated with a label or classification (e.g., adjustment of a weight to a different value (a 'nudge'), making the weight value zero (eliminating the associated node's influence), making the value a maximum value (where the associated node now becomes dominate), changing a process step (e.g., making an adjustment to the labeling agent), altering or replacing a process step, adjusting the label and/or content description, adding a new label, adjusting the behavior labeling system, adjusting the taxonomy system, or adjusting the recommendation system, adjusting neighboring aspects (e.g., changing the labeling agent across related labels and classifications, changing taxonomy for related labels, changing recommendations considering related labels and classifications, or changing the model for labeling unlabeled behaviors for related labels), and the like. In an example, say the behavior labeling system infers a behavior as 'drop shipping', and so labels it as such. Then, if the user does not respond well to the recommendation on the subject of drop shipping, the label is determined to be not good. Possible outcome results could be to review the labeler agent (e.g., look at the individual case, look at the agent's work globally), review the label (e.g., add a new label, modify the label or cease use of the label), adjust the labeling system, adjust the taxonomy system, adjust the recommendation system, and the like.

In embodiments, the self-healing recommendation engine 302 may improve machine learning recommendation modeling through the evaluation, feedback, and adjustment of weights used in the recommendation model 303, such as based on the evaluation of goodness of recommendations; evaluation of each of the recommendation process steps 308, 310, 312; combinations of evaluations (e.g., improving one system may impact another, such as improving the labeling system which in turn improves the taxonomy system); and the like. Results may adjust weights applied to particular labels or classifications or groups of labels or classifications, replace labelers or classifiers, adjust the use of labels and classifiers, and the like. In embodiments, data fields may also be provided to better enable the evaluation of feedback points, such as data fields provided in user behavior data associated with how a user responds to a recommendation.

In embodiments, systems and computer-implemented methods for the self-healing recommendation engine 302 may include receiving a first user behavior data, the first user behavior data associated with a user action taken by a user, where the self-healing recommendation engine 302 utilizes a recommendation model 303 to generate recommendations 314 to users based on user behavior data 304. The self-healing recommendation engine 302 may then label the user behavior, classify the labeled user behavior, generate a recommendation 314 to the user based on the classifying of the labeled user behavior, and provide the recommendation 314 to the user. The self-healing recommendation engine 302 may then receive a second user behavior data, where the second user behavior data is associated with a user response by the user to the recommendation 314, and where the self-healing recommendation engine 302 performs an evaluation of the second user behavior data to perform a corrective action to the recommendation model 303 if the second user behavior data is determined to be indicative of a recommendation result that is below a threshold of confidence. In embodiments, the evaluation may be an evaluation of a process step in the labeling of the user behavior, classifying of the labeled user behavior, generating the recommendation, and the like. The evaluation may be performed by an agent (e.g., a labeling agent, a classification agent, and the like), where the corrective action may be to adjust, modify, replace, and the like, the agent. The evaluating may be a combined evaluation of labeling the user behavior, classifying the labeled user behavior, and/or generating a recommendation. The evaluation may be an evaluation of labeling the user behavior, classifying the labeled user behavior, generating a recommendation, and the like, based on a data field (e.g., the data field of the second user behavior data). The corrective action may be a change to a weighting associated with the recommendation model 303, such as where weighting is associated with the labeling of the user behavior, where the weighting is associated with a weighting function that represents a confidence level on the goodness of the labeling. The weighting may be associated with the classifying of the labeled user behavior, where the weighting is associated with a weighting function that represents a confidence level on the goodness of the classifying. The weighting may be associated with the generating of the recommendation 314, wherein the weighting is associated with a weighting function that represents a confidence level on the goodness of the recommendation 314. The user action may be a browsing action, a communication action, a purchase action, an installation action, and the like. The user action may be an action taken by the user in response to a recommendation. In embodiments, an evaluation user interface 500 may display the second user behavior data in association with a corrective action to the recommendation model.

In embodiments, the e-commerce platform 100 may include evaluating recommendations made through the self-healing recommendation engine 302 to improve the e-commerce platform's global view of how users behave on the e-commerce platform 100 and what intentions their behaviors represent, such as through improving the underlying recommendation model 303 (e.g., changing the weights of model weighting functions to adjust the model's recommendations to more closely match a user's behavior).

In embodiments, the self-healing recommendation engine 302 may provide for manual and automated label generation evaluations 316 based on feedback from recommendations and automated updates of confidence scores.

In a non-limiting example of notations, let domain experts 306 be $E_i, i \in N$ (N domain experts). The evaluations 316 may rank the domain experts 306 by their goodness of labels with respect to downstream recommendations 314, recommend the domain experts 306 with better labels for behaviors they have labeled before, determine which behaviors domain experts 306 should be labeling next, and the like.

Raw behaviors may be denoted as $RB_{vj}$ where $v \in V$ corresponds to a surface (e.g., application, online store, or home page), and $j \in J$ corresponds to a particular instance of behavior content (e.g., if a raw behavior happens multiple times across different shops/users and across time for a given shop/user, they will have the same index j if their content remains the same).

Some raw behaviors may undergo domain experts labeling, denoted by the mapping D:

$$D:(RB_{vj}, T_i) \rightarrow (label_{vji}, RB_{vj}, E_i, C_{vji}),$$

where $label_{vji} \in L$ is an e-commerce-related label, taken from the label set L, for $RB_{vj}$ given by expert E and with confidence score $C_{vji}$. Prior knowledge of $RB_{vj}$ and $T_i$ may be used to set this confidence score, otherwise, a default confidence score may be set.

Behaviors may undergo automated labeling (e.g., by a software labeling agent), such as performed by method $A_c$, denoted by the mapping A:

$$A:(RB_{vj}, C_k) \rightarrow (label_{vjc}, RB_{vj}, A_{vj}, C_{vjc}),$$

where $label_{vjc} \in L$ is given by automated labeler$A_c$ with confidence score $C_{vjc}$ set similarly to the domain experts' confidence scores. This feedback system may rank the automated labelers' goodness of labels with respect to downstream recommendations 314, recommend automated labelers with better labels for behaviors they have labeled before, and the like.

Let a recommendation system implemented by the self-healing recommendation engine 302 be generally denoted by the mapping R, where any number of (label$_{vjx}$, C$_{vjx}$) pairs (x can either correspond to some domain expert T$_x$ or automated labelerA$_c$) from different surfaces and contents can be used as features for a given recommendation:

$$R:( \ldots ,\text{label}_{v1\ j1\ x}, C_{v1\ j\ x}, \ldots ,\text{label}_{vm\ jm\ x}, C_{vm\ jm\ x}, \ldots ) \rightarrow \text{recommendation}.$$

In this mapping, the recommendation may use the labels coming from x as features for producing recommendations 314. The confidence scores may be used to weigh how much R will factor the label into producing the final recommendations. In an alternate model, the recommendation system may not use the confidence score of a given label$_{vjx}$, but would use it to select which x (out of all domain experts and/or automated labelers that produced a label for RB$_{vj}$) to be used for producing recommendations. This variation is written as follows:

$$R:( \ldots ,\text{label}_{v1\ j1\ x}, \ldots ,\text{label}_{vm\ jm\ x}, \ldots ) \rightarrow \text{recommendation}.$$

In the above mappings, model-based reinforcement learning (RL) methods (e.g., Thompson sampling) or heuristics that could update the confidence scores using reward may be used to choose which xis to be used for a given raw behavior's label and confidence score. In an RL setting, for a given raw behavior, x is the action, confidence score from xis the model parameter, and user feedback for the outputted recommendation is the reward.

For each recommendation, a numerical feedback r may be obtained from a user. Each r may be associated with a set of (RB$_{vj}$, label$_{vj\ x}$, C$_{vj\ x}$) for different vj's used to produce the recommendation, where r's are used in the following ways. (1) Rank x (all the experts and automated labelers) by their goodness of labels with respect to downstream recommendations. This is done by aggregating the r values associated with each x (the higher the aggregate, the better xis). Using this, it may be determined which experts and/or automated labelers are the best/worst at labeling with respect to downstream recommendation tasks. (2) For each raw behavior RB$_{vj}$, the best label may be produced (e.g., with respect to recommendations) generated by some x, by finding the x with the highest aggregate of feedback r. This best label may then be propagated back to the inferior experts and/or automated labelers that had produced different labels. This may be useful to supervise (and improve) the experts and/or automated labeling methods. Note that if the experts and/or automated labelers are able to generalize, this produces a reinforcing feedback loop. (3) For raw behaviors RB$_{vj}$'s that did not undergo human labeling, an aggregate of their feedback r may be obtained, noting that this feedback could be attributed purely to the automated labelers. After comparing with the typical values of aggregate r taken over all of the raw behaviors, problematic raw behaviors may be identified with labels that do not produce good recommendations. These problematic raw behaviors may then be set aside to be labeled by domain experts 306, since they are the ones that automated methods are failing to label in a performant way. In embodiments, by continuing this process, the experts' labels may be used to supervise the automated methods for these problematic raw behaviors (e.g., such as through the feedback loop).

Figure 5:
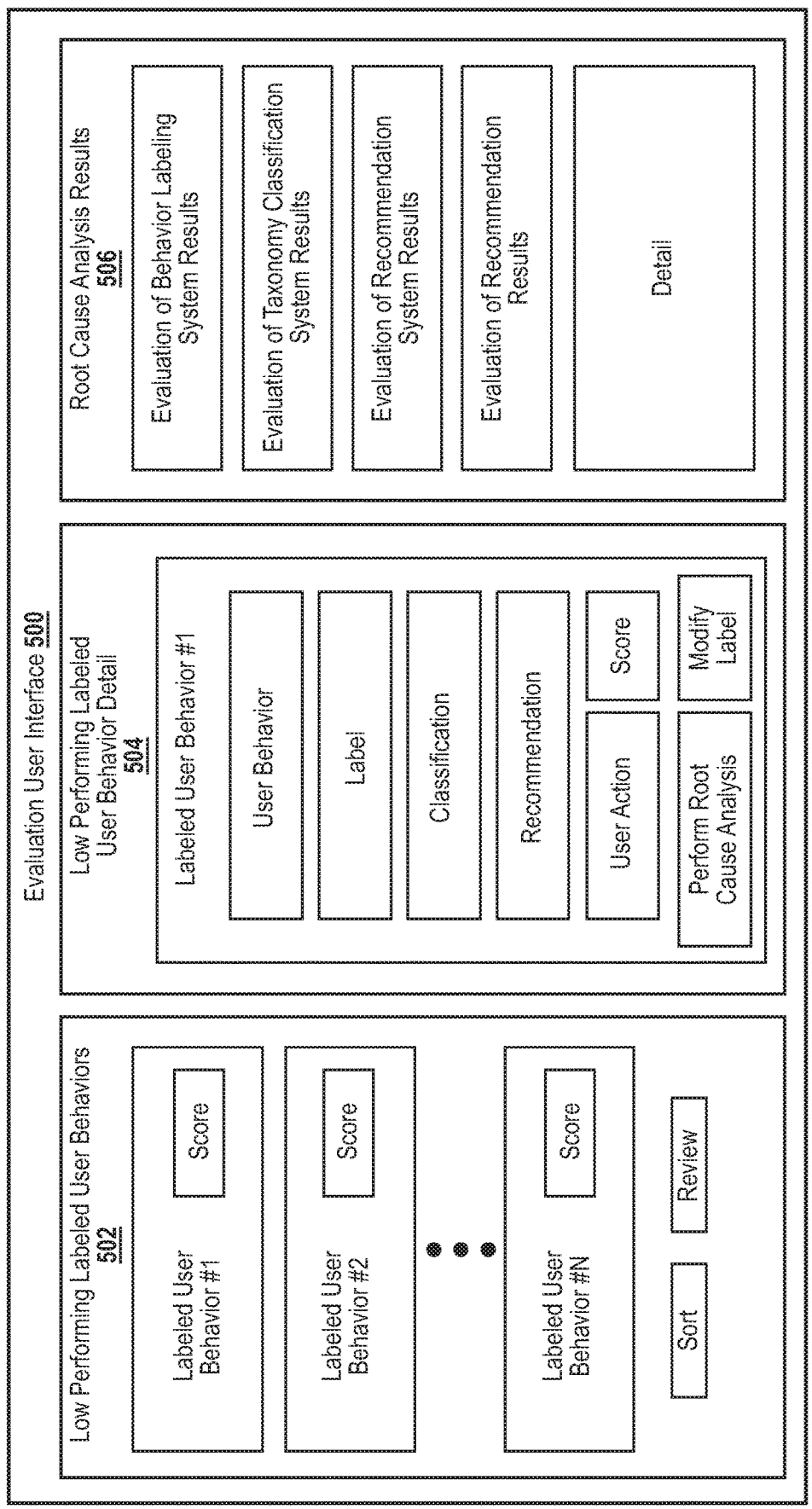
FIG. 5 depicts an embodiment evaluation user interface for an e-commerce platform self-healing engine.

In embodiments, a graphical user interface may be provided in association with use of the self-healing recommendation engine 302, such as to provide feedback to a human agent, to an administrator for managing the recommendation system, for discovering labels that are not performing well (e.g., for a human to analyze and perform a root-cause analysis on a label). In embodiments, the graphical user interface may be displayed on a computing device, caused to be displayed by a computing device on another computing device, and the like. In embodiments, any displaying described herein may be displaying on a computing device, causing to be displayed by a computing device on another computing device, and the like. In a non-limiting example embodiment, FIG. 5 depicts an evaluation user interface 500 for aiding an individual in discovering low performing labels, such as including a portion 502 for displaying a plurality of labeled user behaviors (e.g., for sorting and review), a portion 504 for displaying detail for low performing labels (e.g., as selected for review) such as including a user behavior, label, classification, recommendation, user action, score, and the like (e.g., with function controls for performing a root cause analysis and/or for modifying the label), a portion 506 for displaying root cause analysis results such as including results associated with the evaluation of the behavior labeling system 308, evaluation of the taxonomy classification system 310, evaluation of the recommendation system 312, evaluation of the recommendations 314, and the like, along with associated detail.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
    receiving, by a processor-based recommendation engine, a first user behavior data, the first user behavior data associated with a user action taken by a user, wherein the processor-based recommendation engine comprises a recommendation model adapted to generate recommendations to users based on the first user behavior data, the recommendation model comprising a behavior labeling processing layer and a taxonomy classification processing layer, wherein the behavior labeling processing layer comprises a plurality of labeling weighting functions;
    labeling, by a labeling agent, the first user behavior data, wherein the labeling agent is one of a plurality of labeling agents;
    assigning, by the processor-based recommendation engine, a labeling confidence weighting level to at least one of the plurality of labeling weighting functions related to the labeled first user behavior data based at least in part on past performance of the labeling agent, wherein (i) if the labeling confidence weighting level is greater than a confidence threshold value then the labeled first user behavior data is integrated into the behavior labeling processing layer as a labeled first user behavior data, and (ii) otherwise the labeled first user behavior data is integrated into the behavior labeling processing layer as an unlabeled first user behavior data;
    classifying, by the processor-based recommendation engine, the labeled first user behavior data to create a classified labeled first user behavior data or the unlabeled first user behavior data to create a classified unlabeled first user behavior data, wherein the classified labeled first user behavior data or classified unlabeled first user behavior data are integrated into the taxonomy classification processing layer;
    generating, by the processor-based recommendation engine, a recommendation to the user based at least in part on the recommendation model including the classified labeled first user behavior data or the classified unlabeled first user behavior data;
    providing, by the processor-based recommendation engine, the recommendation to the user;
    receiving, by the processor-based recommendation engine, a response user behavior data, the response user behavior data associated with a user response by the user to the recommendation;

evaluating, by the processor-based recommendation engine, the response user behavior data to determine whether the user response was a positive response or a negative response;

assigning, by the processor-based recommendation engine, a feedback value to the response user behavior data;

determining a ranking value, by the processor-based recommendation engine, for the labeling of the first user behavior data by the labeling agent based on the feedback value and relative to at least a second feedback value obtained as a result of a labeling of a second of the plurality of labeling agents; and adjusting, by the processor-based recommendation engine, the labeling confidence weighting level of the at least one of the plurality of labeling weighting functions based on whether the user response was a positive response or a negative response and on the ranking value, wherein the labeling confidence weighting level assigned to the labeled first user behavior data in the recommendation model and for future assignments of labeling by the labeling agent is decreased for determined negative response based on the ranking value and the labeling confidence weighting level assigned to the labeled first user behavior data in the recommendation model and for future assignments of labeling by the labeling agent is increased for a positive response based on the ranking value.

2. The computer-implemented method of claim 1, further comprising assigning a confidence score in association with labeling the first user behavior data, wherein the evaluating is based on the received response user behavior data.

3. The computer-implemented method of claim 1, wherein the evaluating is an evaluation of a process step in the labeling of the first user behavior data.

4. The computer-implemented method of claim 1, wherein the evaluating is an evaluation of a process step in the classifying of the labeled first user behavior data.

5. The computer-implemented method of claim 1, wherein the evaluating is an evaluation of a process step in the generation of the recommendation.

6. The computer-implemented method of claim 1, further comprising wherein the adjusting is a change to a classification weighting associated with the recommendation model associated with the classifying of the labeled first user behavior data, wherein the classification weighting is associated with a classifying weighting function that represents a confidence level on a goodness of the classifying.

7. The computer-implemented method of claim 1, further comprising wherein the adjusting is a change to a recommendation weighting associated with the recommendation model associated with the generating of the recommendation, wherein the recommendation weighting is associated with a recommendation weighting function that represents a confidence level on a goodness of the recommendation.

8. The computer-implemented method of claim 1, wherein the user action is at least one of a browsing action, a communication action, a purchase action, or an installation action.

9. The computer-implemented method of claim 1, wherein the user action is an action taken by the user in response to a recommendation.

10. The computer-implemented method of claim 1, further comprising:

receiving, by the processor-based recommendation engine, a second user behavior data, wherein the first user behavior data is received from a first user interaction domain and the second user behavior data is received from a second user interaction domain, wherein the recommendation model is adapted to generate recommendations to users based on the first user behavior data and the second user behavior data;

labeling, by the labeling agent, the second user behavior data;

assigning, by the processor-based recommendation engine, a second labeling confidence weighting level to at least one of the plurality of labeling weighting functions related to the labeled second user behavior data based at least in part on past performance of the labeling agent, wherein (i) if the second labeling confidence weighting level is greater than a second confidence threshold value then the labeled second user behavior data is integrated into the behavior labeling processing layer as a labeled behavior data, and (ii) otherwise the labeled second user behavior data is integrated into the behavior labeling processing layer as an unlabeled second user behavior data;

classifying, by the processor-based recommendation engine, the labeled second user behavior data to create a classified labeled second user behavior data and the unlabeled second user behavior data to create a classified unlabeled second user behavior data, wherein the classified labeled second user behavior data and classified unlabeled second user behavior data is integrated into the taxonomy classification processing layer; and generating, by the processor-based recommendation engine, the recommendation to the user based at least in part on the recommendation model including the labeled first user behavior data, the unlabeled first user behavior data, the labeled second user behavior data, and the classified unlabeled second user behavior data;

wherein the adjusting of the labeling confidence weighting level also adjusts the labeling confidence weighting level assigned to the labeled second user behavior data in the recommendation model and for future assignments of labeling by the labeling agent.

11. The computer-implemented method of claim 10, wherein the processor-based recommendation engine longitudinally tracks a plurality of user interaction domains across a period of time, the plurality of user interaction domains comprising the first user interaction domain and the second user interaction domain, wherein the first user behavior data and second user behavior are determined to include instances of behavior content from a single user.

12. The computer-implemented method of claim 11, wherein each of the plurality of user interaction domains are selected from a group consisting of an online store which the user has interacted, a theme adopted in an online store which the user has interacted, a blog which the user has interacted, a new user web-page which the user has interacted, an administrator web-page which the user has interacted, and an application which the user has interacted.

13. A system comprising:

a first computing device comprising a recommendation engine, the recommendation engine receiving a first user behavior data from a data facility, the first user behavior data associated with a user action taken by a user, wherein the recommendation engine utilizes a recommendation model to generate recommendations to users based on the first user behavior data, the recommendation model comprising a behavior labeling processing layer and a taxonomy classification processing layer, wherein the behavior labeling processing layer comprises a plurality of labeling weighting functions, the first computing device configured to store a set of instructions that, when executed, cause the first computing device to:

operate a labeling agent to label the first user behavior data, wherein the labeling agent is one of a plurality of labeling agents;

assign a labeling confidence weighting level to at least one of the plurality of labeling weighting functions related to the labeled first user behavior data based at least in part on past performance of the labeling agent, wherein (i) if the labeling confidence weighting level is greater than a confidence threshold value then the labeled first user behavior data is integrated into the behavior labeling processing layer as a labeled behavior data, and (ii) otherwise the labeled first user behavior data is integrated into the behavior labeling processing layer as an unlabeled first user behavior data;

operate the recommendation engine to classify the labeled first user behavior data;

generate a recommendation directed to the user based on the classifying of the labeled first user behavior data;

provide the recommendation to a second computing device;

receive a response user behavior data, the response user behavior data associated with a user response by the user to the recommendation;

operate the recommendation engine to evaluate the response user behavior data to determine if the user response was a positive response or a negative response;

operate the recommendation engine to assign a feedback value to the response user behavior data;

operate the recommendation engine to determine a ranking value for the labeling of the first user behavior data by the labeling agent based on the feedback value and relative to at least a second feedback value obtained as a result of a labeling of a second of the plurality of labeling agents; and operating the recommendation engine to adjust, the labeling confidence weighting level of the at least one of the plurality of labeling weighting functions based on whether the user response was a positive response or a negative response and on the ranking value, wherein the labeling confidence weighting level assigned to the labeled first user behavior data in the recommendation model and for future assignments of labeling by the labeling agent is decreased for determined negative response based on the ranking value and the labeling confidence weighting level assigned to the labeled first user behavior data in the recommendation model and for future assignments of labeling by the labeling agent is increased for a positive response.

14. The system of claim 13, wherein the evaluation is an evaluation of a process step in the labeling of the first user behavior data.

15. The system of claim 13, wherein the evaluation of the response user behavior data is an evaluation of a process step in the classifying of the labeled first user behavior data.

16. The system of claim 13, wherein the evaluation of the response user behavior data is an evaluation of a process step in the generation of the recommendation.

17. The system of claim 13, wherein the user action is at least one of a browsing action, a communication action, a purchase action, or an installation action.

18. The system of claim 13, wherein the user action is an action taken by the user in response to a recommendation.

19. A computer-implemented method for a user interface, comprising:

receiving, by a recommendation engine, a first user behavior data, the first user behavior data associated with a user action taken by a user, wherein the recommendation engine utilizes a recommendation model to generate recommendations to users based on the first user behavior data, the recommendation model comprising a behavior labeling processing layer and a taxonomy classification processing layer, wherein the behavior labeling processing layer comprises a plurality of labeling weighting functions;

labeling, by a labeling agent, the first user behavior data, wherein the labeling agent is one of a plurality of labeling agents;

assigning, by the recommendation engine, a labeling confidence weighting level to at least one of the plurality of labeling weighting functions related to the labeled first user behavior data based at least in part on past performance of the labeling agent, wherein (i) if the labeling confidence weighting level is greater than a confidence threshold value then the labeled first user behavior data is integrated into the behavior labeling processing layer as a labeled first user behavior data, and (ii) otherwise the labeled first user behavior data is integrated into the behavior labeling processing layer as an unlabeled first user behavior data;

classifying, by the recommendation engine, the labeled first user behavior data to create a classified labeled first user behavior data or the unlabeled first user behavior data to create a classified unlabeled first user behavior data, wherein the classified labeled first user behavior data or classified unlabeled first user behavior data are integrated into the taxonomy classification processing layer;

generating, by the recommendation engine, a recommendation to the user based at least in part on the recommendation model including the classified labeled first user behavior data or the classified unlabeled first user behavior data;

providing, by the recommendation engine, the recommendation to the user;

receiving, by the recommendation engine, a response user behavior data, the response user behavior data associated with a negative user response by the user to the recommendation;

displaying on a computer device the labeled first user behavior and the negative user response;

displaying a root cause analysis, wherein the root cause analysis initiates a root cause processing function to evaluate the labeled first user behavior based on the negative user response;

assigning, by the recommendation engine, a feedback value to the response user behavior data;

determining a ranking value, by the recommendation engine, for the labeling of the first user behavior data by the labeling agent based on the feedback value and relative to at least a second feedback value obtained as a result of a labeling of a second of the plurality of labeling agents; and adjusting, by the recommendation engine, the labeling confidence weighting level of the at least one of the plurality of labeling weighting functions based on the negative user response and on the ranking value.

20. The computer-implemented method of claim 19 wherein the labeled first user behavior is further evaluated based on the labeling of the first user behavior.

21. The computer-implemented method of claim 19 wherein the labeled first user behavior is further evaluated based on the classifying of the labeled first user behavior.

22. The computer-implemented method of claim 19 wherein the labeled first user behavior is further evaluated based on the generating of the recommendation.

23. The computer-implemented method of claim 19 wherein the labeled first user behavior is further evaluated based on a confidence score assigned to the labeled first user behavior.

24. The computer-implemented method of claim 19, wherein the first user behavior data is received from a first user interaction domain selected from a group consisting of an online store which the user has interacted, a theme adopted in an online store which the user has interacted, a blog which the user has interacted, a new user web-page which the user has interacted, an administrator web-page which the user has interacted, and an application which the user has interacted.

25. A system comprising:
a first computing device comprising a recommendation engine, the recommendation engine receiving a first user behavior data from a data facility, the first user behavior data associated with a user action taken by a user, wherein the recommendation engine utilizes a recommendation model to generate recommendations to users based on the first user behavior data, the recommendation model comprising a behavior labeling processing layer and a taxonomy classification processing layer, wherein the behavior labeling processing layer comprises a plurality of labeling weighting functions, the first computing device configured to store a set of instructions that, when executed, cause the first computing device to:
operate a labeling agent to label the first user behavior, wherein the labeling agent is one of a plurality of labeling agents;
assign a labeling confidence weighting level to at least one of the plurality of labeling weighting functions related to the labeled first user behavior data based at least in part on past performance of the labeling agent, wherein (i) if the labeling confidence weighting level is greater than a confidence threshold value then the labeled first user behavior data is integrated into the behavior labeling processing layer as a labeled behavior data, and (ii) otherwise the labeled first user behavior data is integrated into the behavior labeling processing layer as an unlabeled first user behavior data;
operate the recommendation engine to classify the labeled first user behavior data;
generate, by the recommendation engine, a recommendation to the user based on the classifying of the labeled first user behavior data;
provide, by the recommendation engine, the recommendation to the user;
receive, by the recommendation engine, a response user behavior data, the response user behavior data associated with a negative user response by the user to the recommendation;
display, on a second computer device, the labeled first user behavior and the negative user response;
display, on the second computer device, a root cause analysis, wherein the root cause analysis initiates a root cause processing function to evaluate the labeled first user behavior based on the negative user response;
operate the recommendation engine to assign a feedback value to the response user behavior data;
operate the recommendation engine to determine a ranking value for the labeling of the first user behavior data by the labeling agent based on the feedback value and relative to at least a second feedback value obtained as a result of a labeling of a second of the plurality of labeling agents; and
adjust, by the recommendation engine, the labeling confidence weighting level of the at least one of the plurality of labeling weighting functions based on the negative user response and on the ranking value.

26. The system of claim 25 wherein the labeled first user behavior is further evaluated based on the labeling of the first user behavior.

27. The system of claim 25 wherein the labeled first user behavior is further evaluated based on the classifying of the labeled first user behavior.

28. The system of claim 25 wherein the labeled first user behavior is further evaluated based on the generating of the recommendation.

29. The system of claim 25 wherein the labeled first user behavior is further evaluated based on a confidence score assigned to the labeled first user behavior.

* * * * *